United States Patent
Zschoch et al.

(12) 
(10) Patent No.: US 6,569,962 B1
(45) Date of Patent: May 27, 2003

(54) METHOD FOR PRODUCING ETHYLENE HOMOPOLYMERIZATES AND ETHYLENE COPOLYMERIZATES OF A LOWER MASS DENSITY

(75) Inventors: Werner Zschoch, Naumberg (DE); Juan M. Mezquita, Terneuzen (NL); Harald Beer, Holleben (DE); Gerd Lohse, Schkopau (DE); Otto Berbee, Hulst (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/719,602

(22) PCT Filed: Jun. 26, 1999

(86) PCT No.: PCT/DE99/01874

§ 371 (c)(1),
(2), (4) Date: Feb. 13, 2001

(87) PCT Pub. No.: WO00/01740

PCT Pub. Date: Jan. 13, 2000

(51) Int. Cl.$^7$ .............................. C08F 2/38; C08F 10/02
(52) U.S. Cl. ........................ 526/64; 526/88; 526/208; 526/227; 526/235
(58) Field of Search ........................ 526/64, 88, 208, 526/227, 235

(56) References Cited

U.S. PATENT DOCUMENTS

| | | |
|---|---|---|
| 3,334,081 A | 8/1967 | Madgwick et al. |
| 3,420,807 A | 1/1969 | Harrison et al. |
| 3,687,867 A | 8/1972 | Lewis et al. |
| 3,781,255 A | 12/1973 | Balwe et al. |
| 4,579,918 A * | 4/1986 | Metzger et al. ............... 526/64 |
| 5,376,739 A * | 12/1994 | Pfleger et al. ............... 526/64 |
| 6,245,864 B1 * | 6/2001 | Hasenbein et al. ........... 526/64 |

OTHER PUBLICATIONS

Abstract of DD 151453.
Abstract of DE 1795365.
Abstract of DD 251261.
Abstract of DE 2558266.
Abstract of DD 276598.
Journal of Polymer Science, Part A–1, 10 (1), pp. 163–168, (1972).

* cited by examiner

*Primary Examiner*—Fred Teskin

(57) ABSTRACT

The invention pertains to a method for producing ethylene homopolymerizates and ethylene copolymerizates exhibiting a lower mass density of up to 0.930 g/cm$^3$ and a melt index ranging from 0.15 to 25 g/10 min (2.16 kg; 463 K). Said polymerizates exhibit an improved processing stability and improved availability in the installation at pressures greater than 1000 bar and at temperatures of up to 603 K. The polymerizates are produced in tubular reactors in the presence of radical-forming initiators, oxygen thereunder and chain transfer agents, of which at least one comprises an aldehydic structure. According to the inventive method, chemokinetic characteristics of the reactive feed materials (thermal half-life periods, concentrations, dosing quantities) are coupled with fluidically relevant characteristics of the tubular reactor (flow rate) while taking the target product quality (melt index, flow figure) into consideration. This coupling is carried out such that the interfering secondary reactions, especially polar-inductive substitution effects, which can lead to the formation and the enrichment of organic hydroperoxides are reduced to a minimum and, as a result, extraordinarily stable processing conditions can be obtained.

3 Claims, No Drawings

METHOD FOR PRODUCING ETHYLENE HOMOPOLYMERIZATES AND ETHYLENE COPOLYMERIZATES OF A LOWER MASS DENSITY

The invention pertains to a process for producing ethylene homopolymers and ethylene copolymers in the density range up to 0.930 g/cm$^3$ and in the melt index range between 0.15 and 25 g/10 min (2.16 463 K) with improved process stability and plant available at pressures above 1000 bar and at temperatures up to 603 K in tubular reactors in the presence of free radical-forming initiators, including oxygen and chain regulators, at least one of which has an aldehyde structure. The process is characterized by high monomer conversions and products with good application properties for the film sector.

The use of aldehyde chain regulators in olefin polymerization has long been known and investigated (for example, J. Polym. Sci., Part A-1 (1972), 10(1), 163–168).

The procedures are carried out continuously and as multistep processes. According to DE 1,795,365, ethylene polymers are produced which have a narrow molecular weight distribution in that the propionaldehyde used as the chain regulator is used in the individual reaction zones in certain graded quantity ratios.

U.S. Pat. No. 3,334,081 describes a continuous process for polymerization of ethylene in tubular reactors, wherein the reaction mixture, which also contains a $C_{1-8}$-aldehyde as a chain regulator, is introduced into the tubular reactor over at least two separate side streams at different points in the reactor and certain product qualities in terms of the melt index can be achieved by using fixed distances between the inflow and outflow of starting materials and products.

The exact and reproducible adjustment of the respective concentrations of initiator, chain regulator, and possibly comonomers in the input gas streams is a basic prerequisite for stable reaction control at high throughput and the preparation of the desired polymer with constant, good quality.

According to DD 276,598, in the manufacturing of ethylene polymers in multizone tubular reactions with at least two side stream feeds by free radical bulk polymerization using oxygen as an initiator at pressures above 80 MPa and temperatures of 373 to 623 K the supply of the input gas streams in the required composition with regard to the oxygen and chain regulator contents takes place in that first, ethylene streams containing chain regulator and oxygen respectively are formed, and by dividing the gas streams and subsequent mixing of the partial streams together in defined quantities and with intermediate pressure return gas at least three input gas streams with defined and reproducible composition are formed, separately compressed to the reaction pressure, and introduced to the reactor.

The relationship of combinations of organic free radical formers, oxygen, and chain regulators in polymerization processes above 1000 bar at very high monomer conversions, however, is also of decisive importance for guaranteeing the plant availability, the process stability, and the fundamental film properties during preparation of the LDPE, depending on the application characteristics.

In the case of combinations of highly active aldehydes as chain regulators (molecular weight regulators) with low-temperature organic peroxides such as perpivalate or pemeodecanoate and oxygen, wherein the organic peroxide and oxygen are always added in respectively the same reaction zone, when defined addition limits of the aldehyde are exceeded, with the aldehyde not being subject to the chain regulator mechanism, non-free radical (ionic) secondary reactions take place, which are characterized as redox and ion transport reactions between all oxygen-containing materials and can preferentially form relatively thermally stable hydroperoxides (especially tert-butyl-hydroperoxide), which in the case of enrichment in the high-pressure circulation, lead to uncontrollable decomposition reactions.

The decisive process here is the concentration and residence time characteristic of the unconsumed organic low temperature peroxide and the acceleration course of its free radical formation in the reactor zone inlet area with specific (low) Reynolds numbers under the chemical influence of the aldehyde and/or its successive products and the oxygen.

Thus in DD 251,261 for start-up processes, a process is described of how spontaneous reaction mixture decompositions can be avoided in that a certain ratio of the volumes of ethylene to oxygen is established.

According to the process of DD 151,453, in addition to oxygen as initiator the peroxide compound tert-butyl-2-ethylhexanoate (t-b-peroctoate) is suggested to reduce the inhibiting effect of oxygen and, by shifting the polymerization reaction toward the beginning of the reactor, to produce a better space-time yield and achieve shorter tubular reactors. The initiator effectiveness in this combination to be sure is excellent and the process stability good, but the overall monomer conversion with any known chain regulator or chain regulator mixture is not satisfactory.

Numerous processes have also become known for polymerization of ethylene without and with comonomers, according to which the attempt is made to combine the advantages of oxygen initiation and organic peroxide compounds by suitable combinations (e.g., U.S. Pat. Nos. 3,781,255; 3,687,867; 3,420,807). For example, according to DE-OS 2,558,266, ethylene is polymerized under high pressure in the presence of at least three initiating agents, wherein aside from oxygen at least one organic initiating agent with a 10-hour half-life temperature of less than 396 K and at least one with a 10-hour half-life temperature of >403 K are used.

It is also known that peresters, as organic free radical formers, in certain concentration ratios tend to form hydroperoxide with oxygen, and can lead to enrichment at longer residence times. Finally, therefore last but not least process variants are discussed and used generally without molecular oxygen or air, wherein the combinations of aldehyde/high temperature peroxide (ionic) redox systems can form, which can result in a constantly growing free radical deficiency with increasing conversion losses.

In all known publications, the reactor stability criteria are always missing, insofar as chain regulator-initiator combinations with aldehydes, low temperature peroxides with 10-hour half-lives of about <360 K, and oxygen in reactors with cold gas introduction are used, which frequently depending on the respective reactor configuration have a tendency toward labile or unstable process control and/or have low monomer conversions or, in the case of high monomer conversions, are expensive to operate.

The goal of the invention consists of guaranteeing the safe and stable process control with high steady-state continuity and availability in the high-pressure tubular reactor for production of LDPE base materials of low inhomogeneities for the film sector and for compounds under extremely favorable economic manufacturing conditions in the melt index range between 0.15 g/10 min and 25 g/10 min.

The invention pertains to a process technology innovation in the case of high pressure polymerization methods for ethylene in tubular reactor with cold gas guidance for limiting the bulk fraction of (protonic) byproducts and oxidation products produced by auxiliaries, especially of interfering hydroperoxides, as a result of which maximal monomer conversions are produced and excellent properties can be guaranteed in the case of use in the fine, packing, and heavy load film sectors and in the case of cable and piping coating compounds (KBC) on the basis of LDPE. In addition, there is a decisive increase in process stability and plant availability in the case of this free radical polymerization process.

The goal existed, using highly reactive aldehydes as chain regulators, of bringing about a reliable and stable continuous free radical polymerization in multi-zone tubular reaction units using combinations of organic low temperature peroxides and oxygen at maximal conversions. This goal was accomplished by a process with defined input and stability criteria for the fundamental process control and regulation variables.

In this process, chemokinetic characteristic data of thee reactive starting materials (thermal half-lives, concentrations, addition rates) with flow-mechanically relevant characteristic data of the tubular reactor (flow rate) under consideration of the target product quality (melt index, flow coefficient) were coupled in such a way that interfering secondary reactions, especially polar-inductive substitution effects that can lead to formation and enrichment of organic hydroperoxides, are minimized and thus extraordinarily stable process conditions can be achieved.

Here the starting and stability criteria are assigned to a fundamental temperature- and pressure-dependent acceleration field a in each reactor zone with $a=u'/t_{1/2H}$[peroxide], wherein is the mean flow velocity of the monomer (ethylene) or the reaction mixture (ethylene/polyethylene) at the respective addition site of the organic peroxide in $m*s^{-1}$ and $t_{1/2H}$ [peroxide] is the mean temperature- and pressure-dependent half-life of the organic peroxide at the respective current introduction site into the reactor in seconds.

For a, an applicability range of $a=1.0\pm0.7\ m*s^{-2}$, preferably $a=1.0\pm0.5\ m*s^{-2}$ (fundamental definition range) is established, in which the ratio $G/F_z<2$ (chain regulator limitation) is to be fulfilled, wherein G is the maximal pure aldehyde quantity introduced into each reaction zone in mol/hr and $F_z$ is the flow coefficient of the target product, based on the mean melt index, according to the equation:

$$F_z=50*[\log_{10}(MFI)+1].$$

Of determining significance for the use in accordance with the invention is the establishment of defined starting and input concentrations of the organic peroxides in each reaction zone, which match the applicability range of/the definition mentioned, with which the initiation reactions starting from a low-temperature region corresponding to the degradation characteristics of primary radicals and chain growth promoting hydrocarbon radicals are generated without the t-butylhydroperoxide formation, which is always possible, leading to enrichment in the high- and intermediate pressure circulation. In the sense of the invention it makes no difference in which chronological peroxide/oxygen molar ratio the free radical control takes place in the respective reactor zone. Thus according to the invention the input concentration $c_0$ of the organic peroxide, which is introduced into the reactor in the form of a suitable peroxide solution, measured in mol/L of pure peroxide to be added, is to be made only so low that the volume flux defined as the ratio $G/(Fz*c_0)$ (peroxide concentration limitation) is always below 2 $L*h^{-1}$, wherein all parameters characterizing the volume are based on customary normal pressure (1 bar) and 273 K.

Each individual organic peroxide component that is used is separately subject to the concentration limitation mentioned insofar as the fundamental definition range for the acceleration field a is met at the respective starting temperature in the reactor.

Of lesser importance and irrelevant in accordance with the invention thus are those organic peroxides whose free radical formation speed falls in the same thermal region as that of oxygen and which numerically have a 10-hour half-life of equal to or greater than 360 K.

For guaranteeing stable, steady-state process control at maximal monomer conversions it is essential that the two stability criteria $G/F_z<2$ and $G/(F_z*c_0)<2$ are also met in the reaction zones in which, to be sure, organic peroxide is present according to the definition determination, but organic peroxide and oxygen need not be present simultaneously, although organic peroxide and oxygen may be present simultaneously in one or more other zones, preferably in the successor zone. In this way the excess, apparently not control-active aldehyde chain regular fraction does not have a destabilizing effect in the initiation system with organic peroxide and oxygen in the successive zone. In the case of respectively low starting temperatures in the individual reaction zones, using suitable organic peroxides and oxygen, supported by the aldehyde chain regulator, maximal monomer conversions can be achieved with the best process continuity and good optical and mechanical film properties as well as excellent base properties for compounds.

The use of oxygen as a high-temperature peroxide component, according to experience, is substantially more cost-advantageous compared to peroxides and largely saves expensive purging for the sake of limiting the inert fraction.

The advantages of the procedure in accordance with the invention will be illustrated on the basis of the following examples and the results summarized in Table 1, wherein the examples 1 to 5 are comparison examples.

EXEMPLIFIED EMBODIMENTS

Comparison Example 1

In a two-zone tubular reactor, surrounded by a hot water-containing jacket, in each reaction zone free radical polymerization of the ethylene takes place at a reactor pressure of 2230 bar, measured at the input of the first zone, which is fed by 50% of the ethylene delivery volume of a reaction pressure compressor with a total capacity of 22,000 kg/hr. To produce a low density polyethylene with a melt index of 0.75 g/10 min (463 K, 2.16 kg), corresponding to a mean flow coefficient of 43.8, as the free radical formers in the first zone, in which a mean ethylene flow rate of 4.7 m/sec is present, a mixture of tert-butyl-peroxypivalate (t-B-PPV) and oxygen is used, wherein the organic peroxide is present at 12.0 wt %, corresponding to 0.62 mol/L pure t-B-PPV, in the solution with a saturated liquid hydrocarbon mixture. At a starting temperature of 413 K in the first zone, the half-life of the t-B-PPV/is 4.2 sec. A quantity of 1.86 mol/hr pure t-B-PPV is added, and to achieve a maximum temperature of 568 K, 1.93 mol/hr of oxygen. To establish the desired melt index, a specific propionaldehyde dose $G/F_z$ of 2.25 mol/hr is adjusted in the first zone. Under these process conditions in an acceleration field $a=u'/t_{1/2H}$ of 1.12 m/sec$^2$ a specific chain regulator-peroxide volume flux ratio $G/(F_z*c_0)$ of 3.62 L/hr is present, which to be sure leads to a high computed product output in the first zone with 1800 kg/hr, but has extremely low process reliability and plant stability, accompanied by very frequent emergency shutoffs because of thermal reaction mixture decomposition and thus is unjustifiable from the viewpoint of process and safety engineering. By cooling the reaction mixture from the first zone and mixing with cold gas from the reaction pressure compressor, a new starting temperature at the input of the second zone of 429 K is formed, at which point an initiator mixture of tert-butyl-peroctoate (t-B-PO) and oxygen is metered in, wherein t-B-PO is used as a 7.0 wt % solution, corresponding to 0.29 mol/L, with a dispensing quantity of 2.18 mol/hr and oxygen with 4.91 mol/hr. Although no aldehyde is metered in as a chain regulator in the second zone, irregular process control can occur due to pronounced temperature fluctuations, since because of the half-life of the t-B-PO of 7.3 s at this starting temperature and 9.5 m/s mean flow speed, an acceleration field $a=u'/t_{1/2H}$ of 1.30 m/s$^2$ exists. In general, the total polyethylene synthesis unit, with a good product output of 5,000 kg/hr and good polyethylene quality, is highly susceptible to disturbances and dangerous to safety.

Comparison Example 2

In the same tubular reactor unit as in Example 1, a low density polyethylene with a melt index of 2.0 g/10 min (463 K, 2.16 kg), corresponding to a mean flow coefficient of 65.1, is produced. As the organic peroxide in the first zone likewise tert-butyl-peroxypivalate (t-B-PPV) with a starting concentration of 10.0 wt % containing 0.52 mol/L pure peroxide fraction is introduced at a mean flow rate of 7.4 m/sec and a starting temperature of 411 K, corresponding to a half-life at the dispensing site of 5.0 s, wherein in an acceleration field of 1.48 m/s$^2$ a specific chain regulator quality (propionaldehyde) $G/F_z$ of 2.07 mol/h and a specific chain regulator-peroxide volume flux ratio $G/(F_z*c_0)$ of 3.59 L/h are effective. In the case of an economically advantageous product ejection with good film quality, decomposition reactions take place continuously in the reactor, which on one hand very often pose an extreme danger to the plant safety (explosion risk), and on the other hand, continuously release large volumes of soot-containing expansion gas with polyethylene particles and thus have raw material-destroying and environment-harming effects.

The high monomer conversion in the second reaction zone of 3300 kg/h in conjunction with the output from the first zone of 1800 kg/h nevertheless does not permit risk-free reaction control.

Comparison Example 3

In Comparison Example 3, as in Comparison Example 1, the same product with the same melt index is produced. At the same flow rate of 4.7 m/s and the same starting temperature of 413 K in the first zone, operations are performed with a tert-butyl-peroctoate (t-B-PO)-oxygen mixture as a free radical former, so that the half-life at the metering site amounts to 28.2 s and the initiation system lies in an acceleration field of 0.17 m/s$^2$. Whereas the chain regulator propionaldehyde with 2.29 mmol/h specific metering quantity is only dispensed into the first reaction zone and with 0.29 mol/L starting concentration of t-B-PO, a very high value in the case of the specific volume flow ratio $g/(F_z*c_0)$ of 7.85 L/h is seen, under stable production conditions an economically unfavorable product output is observed, which in the first zone is computed at 1600 kg/h and in conjunction with the process ratios in the second zone, as in Comparison Example 1, gives only a total yield of 4800 kg/h.

Comparison Example 4

As in Comparison Example 3, a polyethylene with a melt index of 2.0 g/10 min, corresponding to a flow coefficient of 65.1, is produced at a flow rate in the first zone of 7.0 m/s using tert-butyl-peroctoate (t-B-PO)-oxygen mixture with respectively 7.0 wt %, corresponding to 0.29 mol/L, organic peroxide in the peroxide solution at a starting temperature of 413 K, corresponding to 28.2 s half-life. The acceleration field in the first zone is numerically characterized with 0.25 m/s$^2$. For regulating the melt index in the first zone a chain regulator quantity (propionaldehyde) $G/F_z$ of 1.46 mol/h is added and thus a specific chain regulator-peroxide volume flow ratio $G/(F_z*c_0)$ of 5.02 L/h is effective. In the second reaction zone, in addition to the free radical formers (t-B-PO-oxygen mixture) at a meanflow rate of 9.5 m/s and a reaction start of 433 K, corresponding to 5.3 s half-life of the organic peroxide, an acceleration of 1.80 m/s$^2$ is effective. Here also propionaldehyde is added at a specific rate $G/F_z$ of 0.74 mol/h, which in conjunction with the peroxide concentration leads to a volume flow ratio $G/(F_z*c_0)$ of 2.54 L/h. Despite the stable and safe process control with excellent optical properties of the films prepared from the LDPE, only a monomer conversion corresponding to a product output totally 4600 kg/h can be realized.

Comparison Example 5

In a three-zone reactor, which is likewise surrounded by a hot water jacket, in each reaction zone a free radical polymerization of the ethylene takes place at a reactor pressure of 2250 bar, measured at the outlet of the first zone, which is fed by 50% of the ethylene delivery quantity of a reaction pressure compressor with 56,500 kg/h total capacity. To produce a low-density polyethylene with a melt index of 0.25 g/10 min (463 K, 216 kg), corresponding to a mean flow coefficient of 19.9, as free radical former in the first zone, in which a mean flow rate of the ethylene of 12.1 m/s is present, a mixture of tert-butyl-peroctoate (t-B-PO) and di-tert-butyl-peroxide (DTBP) is used, wherein t-B-PO is contained at 33.8 wt %, corresponding to 1.41 mol/L, pure peroxide in the solution together with DTBP. At a starting temperature in the first zone of 415 K, the half-life of the t-B-PO is 28.2 s. Then 21.1 mol/h pure t-B-PO are added, and to produce a maximal temperature of 583 K, a corresponding quantity of DTBP. To establish the desired melt index in the first zone a specific propionaldehyde dose $G/F_z$ of 2.17 mol/h is established. Under these process conditions in an acceleration field $a=u'/t_{1/2H}$ of 0.43 m/s$^2$ a specific chain regulator-peroxide volume flux ratio $G/(F_z*c_0)$ of 1.54 L/h exists, which to be sure leads to a high ejection in the first zone with 5300 kg/h and also has a good process stability in zone 1, but in the second zone at an acceleration of 0.60 m/s$^2$, which results in the presence of t-B-PO and oxygen from the half-life of 18.3 measurable at the existing starting temperature of 418 K and a flow rate of 11.0 m/s, in the absence of freshly added aldehyde in,the second zone marked reactor temperature fluctuations are observed, which have an unacceptable great effect on the melt index, so that the desired (narrow) index range cannot be reliably maintained. In conjunction with a renewed free radical initiation at the inlet of the third zone at a start temperature of 565 K and a third maximum temperature of 587 K without the use of organic peroxide, a monomer conversion corresponding to an output of 15,800 kg/h can be anticipated for product applications in the/heavy-load film range.

Example 6

As in Comparison Example 1, in the same reactor that is supplied with ethylene from the reaction pressure compressor in the same way, for producing/the same product under the same input pressure and maximum temperatures the same peroxide types are used in respectively the same zone at the same respective flow rate of 4.7 m/s in the first reaction zone and of 9.5 m/s in the second reaction zone at the same starting temperature in the first zone of 413 K, corresponding to a half-life of the t-B-PPV of 4.2 s, but at a starting and mixing temperature of 423 K in the second zone, corresponding to a half-life of the t-B-PO of 11.9 s, are used. The introduction of the chain regulator propionaldehyde to establish the desired melt index of 0.75 g/10 min, corresponding to a flow coefficient of 43.8, takes place both as a partial quantity in the first zone, wherein here in contrast to Comparison Example 1, 1.62 mol/h specific aldehyde dose $G/F_z$ is added and as a partial quantity in zone 2 with 0.79 mol/h $G/F_z$. In the same acceleration field of the first zone as in Comparison Example 1 of $a=u'/t_{1/2H}$ equal to 1.12 $m^2$ the organic peroxide for initiation in the first zone is introduced with a concentration of 16.0 wt % or 0.83 mol/L pure peroxide, so that in conjunction with the chain regulator distribution achieved, a specific chain regulator-peroxide volume flow ratio $G/(F_z*c_0)$ of 1.95 L/h is present. In the second zone, in an acceleration field of $a=u'/t_{1/2H}$ equal to 0.80 m/s$^2$ a specific chain regulator-peroxide volume flow ratio factor $G/(F_z*c_0)$ of 1.90 L/h exists, which is adjusted in quantity by the use of a 10 wt % t-B-PO batch with 0.42 mol/L pure peroxide. In this way at a high overall conversion, analogous to Comparison Example 1, extraordinarily constant polymerization conditions, stable in terms of process technology, exist in the unit, from which at no time do dangers arise due to thermally uncontrolled explosive reactions.

It is worth noting that even when higher reactor pressures are used in LDPE tube reactors (e.g., 2800 bar) the determining specific aldehyde chain regulator quantity and peroxide concentration limitations are maintained within the efficacy range of the defined acceleration field in that target product-dependent combinations of aldehydic and olefinic or other chain regulators are used and the peroxide effectiveness, which generally increases with the ethylene pressure, is not realized by arbitrary concentration dilutions of the peroxide solutions used, but rather by adjusting the consumption of the relevant peroxide over the consumption or dose rates (mol/h).

Examples 7–9

In analogy to Comparison Example 5, in Examples 7 to 9 in the same high-pressure polyethylene unit with the same reactor configuration and the same ethylene supply in the case of the same target product and in the zones of respectively the same flow rates, polymerization takes place with sometimes different relevant organic peroxides and di-tert-butylperoxide in the first zone, and in contrast to Comparison Example 5 (5) in all cases with t-B-PPV and oxygen in the second zone under once again the same process conditions in the third zone. In all three examples the same starting temperatures and half-lives and correspondingly the same numerical acceleration field a of 1.69 m/s$^2$ exists in the second zone. Furthermore, Example 7 differs from (5) under otherwise identical initiation conditions in the first zone only in terms of the specific aldehyde dosage, in that to maintain the chain regulator limitation $G/F_z<2.0$ and the chain regulator-peroxide volume flux ratio $G/(F_z*c_0)<2.0$, splitting of the aldehyde quantity is performed. The use of t-B-PPV in the first zone in Example 8 compared to t-B-PO in Example 7 and (5) makes possible the utilization of even lower polymerization-active temperatures and in contrast to (5) without signs of thermal instability in the peroxide- and oxygen-initiated successor zone with good economic results and comparable product properties for the special application case in the packaging film, shrink film, and heavy load film areas. When a peroxide solution with a content of 24 wt % t-B-perneodecanoate is used, corresponding to 0.88 mol/L at 273 K and normal pressure, pure peroxide in Example 9 and a reactor inlet temperature of 397 K in the first zone, corresponding to a half-life of 7.1 s, with respect to (5) a distinct monomer conversion increase can be achieved, which has a positive economic effect due to an output increase in zone I of at least 0.2 t/h in comparison to (5). The process stability and yield are good as long as the dosage and concentration ratios of aldehyde and relevant peroxide described in each (oxygen-containing) reaction zone exist on the basis of a defined acceleration mechanism in the free radical formation phase in the reactor in a (chemically) quantitative functional relationship.

TABLE 1

| Example | Tube reactor unit | Zone | MFI [g/10 min] | Fz | mean [m/s] | relevant peroxide type | 10-h half-life temp [K] | peroxide concentration [wt %] | $c_0$ [mol/L] |
|---|---|---|---|---|---|---|---|---|---|
| Comp. Ex. 1a | 1 | 1 | 0.75 | 43.8 | 4.7 | t-B-perpivalate | 330 | 12.0 | 0.82 |
| Comp. Ex. 1b | 1 | 2 | 0.75 | 43.8 | 9.5 | t-B-peroctoate | 345 | 7.0 | 0.29 |
| Comp. Ex. 2a | 1 | 1 | 2.0 | 65.1 | 7.4 | t-B-perpivalate | 330 | 10.0 | 0.52 |
| Comp. Ex. 2b | 1 | 2 | 2.0 | 65.1 | 9.5 | t-B-perpivalate | 330 | 10.0 | 0.52 |
| Comp. Ex. 3a | 1 | 1 | 0.75 | 43.8 | 4.7 | t-B-peroctoate | 345 | 7.0 | 0.29 |
| Comp. Ex. 3b | 1 | 2 | 0.75 | 43.8 | 9.5 | t-B-peroctoate | 345 | 7.0 | 0.29 |
| Comp. Ex. 4a | 1 | 1 | 2.0 | 65.1 | 7.0 | t-B-peroctoate | 345 | 7.0 | 0.29 |
| Comp. Ex. 4b | 1 | 2 | 2.0 | 65.1 | 9.5 | t-B-peroctoate | 345 | 7.0 | 0.29 |
| Comp. Ex. 5a | 2 | 1 | 0.25 | 19.9 | 12.1 | t-B-peroctoate | 345 | 33.8 | 1.41 |
| Comp. Ex. 5b | 2 | 2 | 0.25 | 19.9 | 11.0 | t-B-peroctoate | 345 | 19.9 | 0.83 |
| Ex. 6a | 1 | 1 | 0.75 | 43.8 | 4.7 | t-B-perpivalate | 330 | 16.0 | 0.83 |
| Ex. 6b | 1 | 2 | 0.75 | 43.8 | 9.5 | t-B-peroctoate | 345 | 10.0 | 0.42 |
| Ex. 7a | 2 | 1 | 0.25 | 19.9 | 12.1 | t-B-peroctoate | 345 | 33.8 | 1.41 |
| Ex. 7b | 2 | 2 | 0.25 | 19.9 | 11.0 | t-B-perpivalate | 330 | 12.5 | 0.65 |
| Ex. 8a | 2 | 1 | 0.25 | 19.9 | 12.1 | t-B-perpivalate | 330 | 17.5 | 0.90 |
| Ex. 8b | 2 | 2 | 0.25 | 19.9 | 11.0 | t-B-perpivalate | 330 | 12.5 | 0.65 |
| Ex. 9a | 2 | 1 | 0.25 | 19.9 | 12.1 | t-B-perneodecanoate | 319 | 24.0 | 0.88 |
| Ex. 9b | 2 | 2 | 0.25 | 19.9 | 11.0 | t-B-perpivalate | 330 | 12.5 | 0.65 |

TABLE 1-continued

| Example | High temp. free radical former | Start temp [K] | $t_{1/2H}$ [s] | $a = u'/t_{1/2H}$ [m/s$^2$] | PA dose in zone [kg/h] | PA/Fz [mol/h] | PA/Fz/c$_0$ [L/h] | PE output [t/h] | PE output total [t/h] | Process stability |
|---|---|---|---|---|---|---|---|---|---|---|
| Comp. Ex. 1a | oxygen | 413 | 4.2 | 1.12 | 5.7 | 2.25 | 3.62 | 1.8 | | frequent decomposition |
| Comp. Ex. 1b | oxygen | 420 | 7.3 | 1.30 | 0 | 0.00 | 0.00 | 3.2 | 5.0 | unstable product |
| Comp. Ex. 2a | oxygen | 411 | 5.0 | 1.48 | 7.8 | 2.07 | 3.59 | 1.8 | | frequent decomposition |
| Comp. Ex. 2b | oxygen | 408 | 6.5 | 1.46 | 0 | 0.00 | 0.00 | 3.3 | 5.1 | unstable product |
| Comp. Ex. 3a | oxygen | 413 | 28.2 | 0.17 | 5.8 | 2.29 | 7.85 | 1.6 | | stable product |
| Comp. Ex. 3b | oxygen | 429 | 7.3 | 1.30 | 0 | 0.00 | 0.00 | 3.2 | 4.8 | stable product |
| Comp. Ex. 4a | oxygen | 413 | 28.2 | 0.25 | 5.5 | 1.46 | 5.02 | 1.6 | | stable product |
| Comp. Ex. 4b | oxygen | 433 | 5.3 | 1.80 | 2.8 | 0.74 | 2.54 | 3.0 | 4.6 | stable product |
| Comp. Ex. 5a | di-t-B-peroxide | 413 | 28.2 | 0.43 | 2.5 | 2.17 | 1.54 | 5.3 | | stable product |
| Comp. Ex. 5b | oxygen | 418 | 18.3 | 0.60 | 0.0 | 0.00 | 0.00 | 10.5 | 15.8 | unstable vs. zone 1 |
| Ex. 6a | oxygen | 413 | 4.2 | 1.12 | 4.1 | 1.62 | 1.95 | 1.8 | | stable product |
| Ex. 6b | oxygen | 423 | 11.9 | 0.80 | 2.0 | 0.79 | 1.90 | 3.3 | 5.1 | stable product |
| Ex. 7a | di-t-B-peroxide | 413 | 28.2 | 0.43 | 2.0 | 1.73 | 1.23 | 5.0 | | stable product |
| Ex. 7b | oxygen | 408 | 6.5 | 1.69 | 1.0 | 0.87 | 0.87 | 11.0 | 16.0 | stable product |
| Ex. 8a | di-t-B-peroxide | 407 | 7.1 | 1.70 | 2.0 | 1.73 | 1.92 | 5.0 | | stable product |
| Ex. 8b | oxygen | 408 | 6.5 | 1.69 | 1.0 | 0.87 | 1.34 | 11.0 | 16.1 | stable product |
| Ex. 9a | di-t-B-peroxide | 397 | 7.1 | 1.70 | 2.0 | 1.73 | 1.96 | 5.5 | | stable product |
| Ex. 9b | oxygen | 408 | 6.5 | 1.69 | 1.0 | 0.87 | 1.34 | 11.0 | 16.5 | stable product |

What is claimed is:

1. Process for production of ethylene homopolymers and copolymers in the density range up to 0.933 g/cm$^3$ and in the melt flow index range between 0.15 and 25 g/10 min. (2.16 kg, 463 K) at pressures above 1000 bar and at temperatures up to 603 K in multizone pipe reactors in the presence of radical-forming initiators, including oxygen and chain regulators, of which at least one displays an aldehydic structure and optionally other modifiers and comonomers, comprising an acceleration field that is temperature and pressure dependent and coordinated with each reaction zone the process conditions are adjusted in such a way that $a=u'/t_{1/2H}$ [peroxide], in which u', is the average flow velocity of the monomer or reaction mixture at the metering site in question of the inorganic or organic peroxide in m*s$^{-1}$ and $t_{1/2H}$ [peroxide] is the average temperature and pressure-dependent half-life of the peroxide at the metering site in question in the reactor in seconds, in a validity range of $a=1.0\pm0.7$ m*s$^{-2}$, the ratio G/F$_z$<2 is satisfied where G is the maximal quantity of pure aldehyde metered into each reaction zone in mole/h and F$_z$ is the liquidity index relative to the average melt flow index of the target product according to the relationship $F_z=50*[\log_{10}(MFI)+1]$ and MFI is the average measured melt flow index in g/10 min. of the desired target product under the usual measurement conditions for LDPE of 463 K and 2.16 kg load.

2. Process as in claim 1 comprising the concentration of each organic peroxide used c$_0$, measured in mole/l pure peroxide is only set low enough that the volume stream defined as the ratio G/(F$_z$*c$_0$) measured in l*h$^{-1}$ is always <2.

3. Process as in claim 1 characterized by the fact that two stability criteria G/F$_z$<2 and G/(F$_z$*c$_0$)<2 are also valid in the reaction zones in which organic peroxide (initiator 1) is always present but organic peroxide and oxygen (initiator 2) need not be simultaneously present, but initiator 1 and initiator 2 are simultaneously present in one or more other zones.

* * * * *